(12) United States Patent
Laskis et al.

(10) Patent No.: US 10,040,586 B2
(45) Date of Patent: Aug. 7, 2018

(54) PACKAGE GROUPING UNIT WITH PACKAGE LINEAR SPEED REDUCTION

(71) Applicant: Tetra Laval Holdings & Finance S.A., Pully (CH)

(72) Inventors: Jon Paul Laskis, Simpsonville, SC (US); Mathias N. Coulomb, Greenville, SC (US); Giorgio Santoni, Formigine (IT); Alessandro Morselli, Castelfranco Emilia (IT); Brian Williams, Simpsonville, SC (US); Slobodan Milosevic, Schaumburg, IL (US); Tony Kinas, Greer, SC (US)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/552,413

(22) PCT Filed: May 27, 2016

(86) PCT No.: PCT/EP2016/062031
§ 371 (c)(1),
(2) Date: Aug. 21, 2017

(87) PCT Pub. No.: WO2016/202557
PCT Pub. Date: Dec. 22, 2016

(65) Prior Publication Data
US 2018/0086490 A1    Mar. 29, 2018

(30) Foreign Application Priority Data

Jun. 15, 2015 (EP) .................................... 15172012

(51) Int. Cl.
*B65G 47/08*    (2006.01)
*B65B 35/10*    (2006.01)
(Continued)

(52) U.S. Cl.
CPC ............ *B65B 35/405* (2013.01); *B65B 35/44* (2013.01); *B65B 59/005* (2013.01); *B65G 47/082* (2013.01); *B65B 2210/02* (2013.01)

(58) Field of Classification Search
CPC .... B65B 39/405; B65B 59/005; B65G 47/082
(Continued)

(56) References Cited

U.S. PATENT DOCUMENTS 4,577,745 A     3/1986  Calvert
4,874,080 A *  10/1989  Wroblewski ........... B65G 15/50
                                                          198/463.6
(Continued)

FOREIGN PATENT DOCUMENTS

EP          1 153 859      11/2001
EP          2 799 348      11/2014
WO     WO 2004-026736      4/2004

OTHER PUBLICATIONS

International Search Report from corresponding PCT Application No. PCT/EP2016/062031 (3 pages).

*Primary Examiner* — Douglas A Hess
(74) *Attorney, Agent, or Firm* — Finnegan, Henderson, Farabow, Garrett & Dunner LLP

(57) ABSTRACT

Package grouping unit for a packaging line operable to produce multipacks; the grouping unit (1) comprises a linear conveyor (9) operable to feed a succession of packages (2) at a first speed (V1); and at least one grouping assembly (6) formed by two sub-assemblies (12a, 12b); wherein each sub-assembly comprises a pair of endless conveyors (13a, 14a; 13b, 14b) and define, with the endless conveyors (13a, 14a; 13b, 14b) of the other sub-assembly (12b, 12a), a package grouping channel (22) having a package inlet (7) and a group outlet (8); each endless conveyor is provided with a number of package retaining elements (26); the endless conveyors are operable independently from each (Continued)

other to move a first retaining element (26) through the package inlet (7) at a second speed (V3) lower than the first speed (V1) so as to intercept and slow down a first package (2) in the succession and cause the packages (2) to group; and to move a second retaining element (26), carried by a different endless conveyor (13a; 14a; 13b; 14b), through the package inlet (7) so as to intercept the last package (2) in the succession and define, with the first retaining element (26), a seat that is so sized as to accommodate a package group (3) and is movable, with the package group (3), along the grouping channel (22).

8 Claims, 2 Drawing Sheets

(51) Int. Cl.
 *B65B 35/40* (2006.01)
 *B65B 59/00* (2006.01)
 *B65B 35/44* (2006.01)
(58) Field of Classification Search
 USPC ......... 198/418.7, 418.8, 418.9, 419.1, 419.2, 198/419.3, 459.8, 460.3, 461.1, 462.1, 198/604, 608
 See application file for complete search history.

(56) References Cited

U.S. PATENT DOCUMENTS

| | | | | |
|---|---|---|---|---|
| 5,368,665 | A * | 11/1994 | Koyama | E04F 13/142 156/278 |
| 5,785,169 | A * | 7/1998 | Egger | B65G 51/035 198/493 |
| 6,907,979 | B2 * | 6/2005 | Ford | B65B 35/30 198/419.3 |
| 7,665,598 | B2 * | 2/2010 | Begin | B65G 47/082 198/419.1 |
| 7,798,308 | B2 * | 9/2010 | Ranger | B65G 47/2445 198/377.05 |
| 9,061,838 | B2 * | 6/2015 | van de Loecht | B65G 47/31 |
| 9,272,849 | B2 * | 3/2016 | Lukes | B65B 35/24 |
| 9,554,581 | B2 * | 1/2017 | Willburger | A22C 11/008 |
| 9,764,904 | B2 * | 9/2017 | Barber | B65G 47/086 |
| 9,809,396 | B2 * | 11/2017 | Joehren | B65B 17/02 |
| 9,873,571 | B2 * | 1/2018 | Hahn | B65G 47/082 |

* cited by examiner

PACKAGE GROUPING UNIT WITH PACKAGE LINEAR SPEED REDUCTION

This is a National Phase of PCT Application No. PCT/EP2016/062031, filed May 27, 2016, which claims the benefit of European Application No. 15172012.5 filed Jun. 15, 2015, both of which are incorporated herein by reference.

TECHNICAL FIELD

The present invention relates to a package grouping unit with package linear speed reduction.

The present invention, although suitable to be used in any multipack production line, may be used to particular advantage in the field of food industry in a packaging line of pourable food products, such as fruit juices, milk, wine, etc., to which the following description refers purely by way of example.

BACKGROUND OF INVENTION

As known, a packaging line of the above type comprises, in general, a packaging machine which is adapted to form the packages with the product already inside. In particular, the packages are generally produced from a sheet packaging material, which is normally in the form of pre-cut blanks or a continuous strip, and which is subjected to a series of folding and longitudinal sealing operations to form a continuous tube of packaging material, which, after being filled, is welded, transversely divided and formed to take the form of individual packages.

The packages are then supplied to a grouping unit to be arranged in groups of a given number of packages and advanced, finally, to a wrapping machine to be wrapped by a wrapping material, normally cardboard or plastic film, and to form multipacks.

Depending on the size of the multipack, the packaging line may have a single-line or a multi-line configuration. In the latter case, immediately upstream from the grouping unit there is normally arranged a divider, which is adapted to remove the packages from an output of the packaging machine and to distribute the packages, aligned with one another, in a determined number of parallel lines. The grouping unit is configured to group the packages in each line and order the groups along the respective lines to allow a transfer device to withdraw a group from each line, simultaneously, and feed the groups to the wrapping machine to be arranged in a compact configuration and wrapped to form a multipack.

Regardless of the multipack format and, therefore, of the number of lines of the grouping unit, it is known that the transfer of the packages from the packaging machine to the wrapping machine is a very critical stage for the stability and integrity of the packages. This stems from the fact that the package output linear speed from the packaging machine is normally considerably higher than the speed with which the groups are fed to the wrapping machine and it is essential to slow down the packages which are fed with high speed to the grouping unit in order to ensure that the linear speed of the groups fed to the wrapping machine and the wrapping machine input speed are equal.

Since at this stage the packages are subjected to a relatively high reduction of the advancing speed, especially in view of the high production speed of the new generation packaging machines, it is very important to reduce the linear speed of the packages in a manner as controlled and gentle as possible to avoid dropping of packages or damage thereof.

DISCLOSURE OF INVENTION

An object of the present invention is to provide a package grouping unit, which allows reducing the linear speed of the packages while minimizing the risks of package falling and damage and, moreover, is relatively flexible in terms of multipack format change According to the present invention, there is provided a package grouping unit as claimed in claim 1 and, preferably, in any one of the claims depending directly or indirectly on claim 1.

BRIEF DESCRIPTION OF THE DRAWINGS

A non-limiting embodiment of the present invention will be described by way of example with reference to the attached drawings, in which.

DETAILED DESCRIPTION OF PREFERRED EMBODIMENTS

Figure 1:
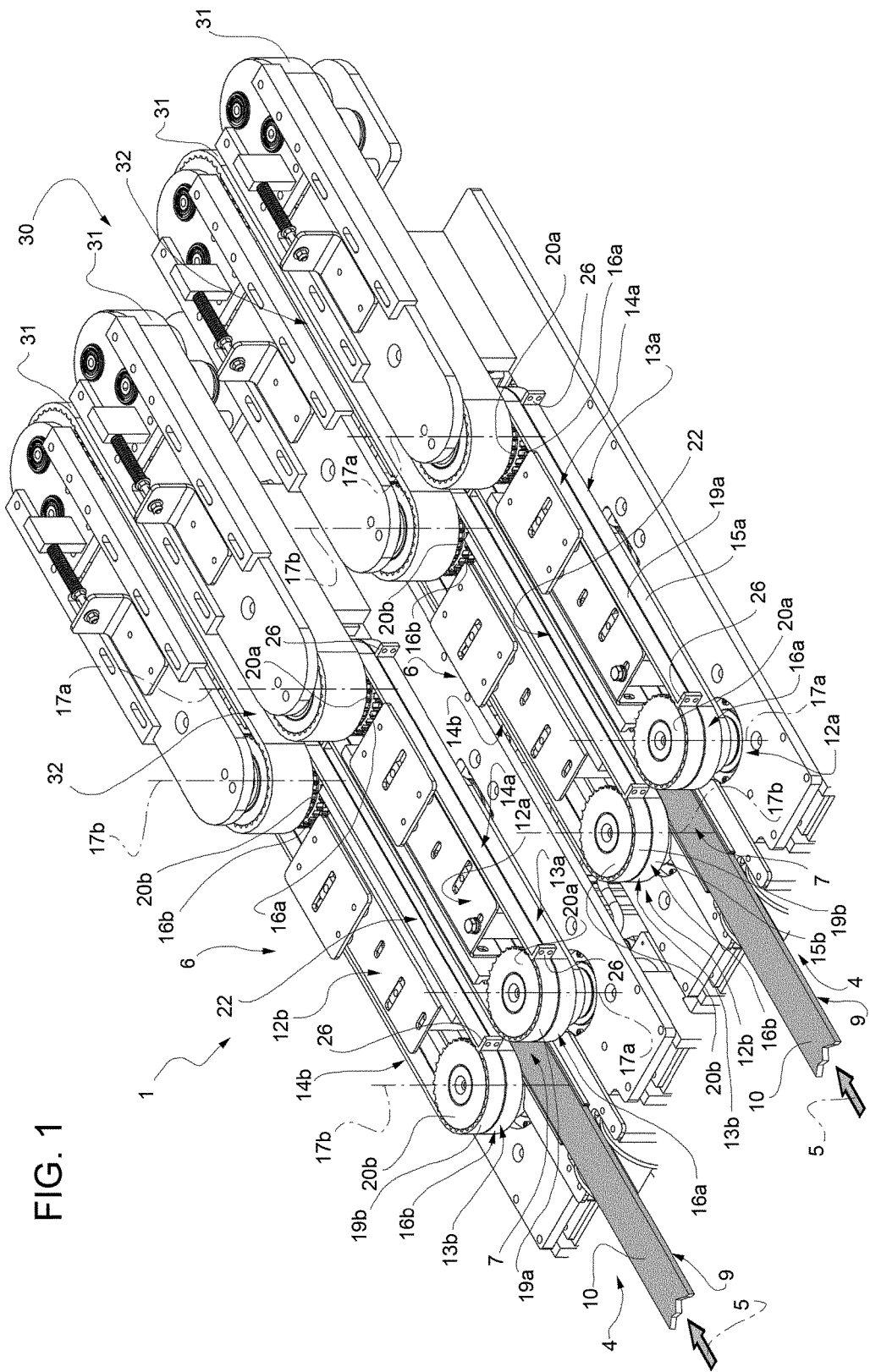
FIG. 1 shows, in perspective view, a preferred embodiment of the package grouping unit according to the present invention.
Figure 2:
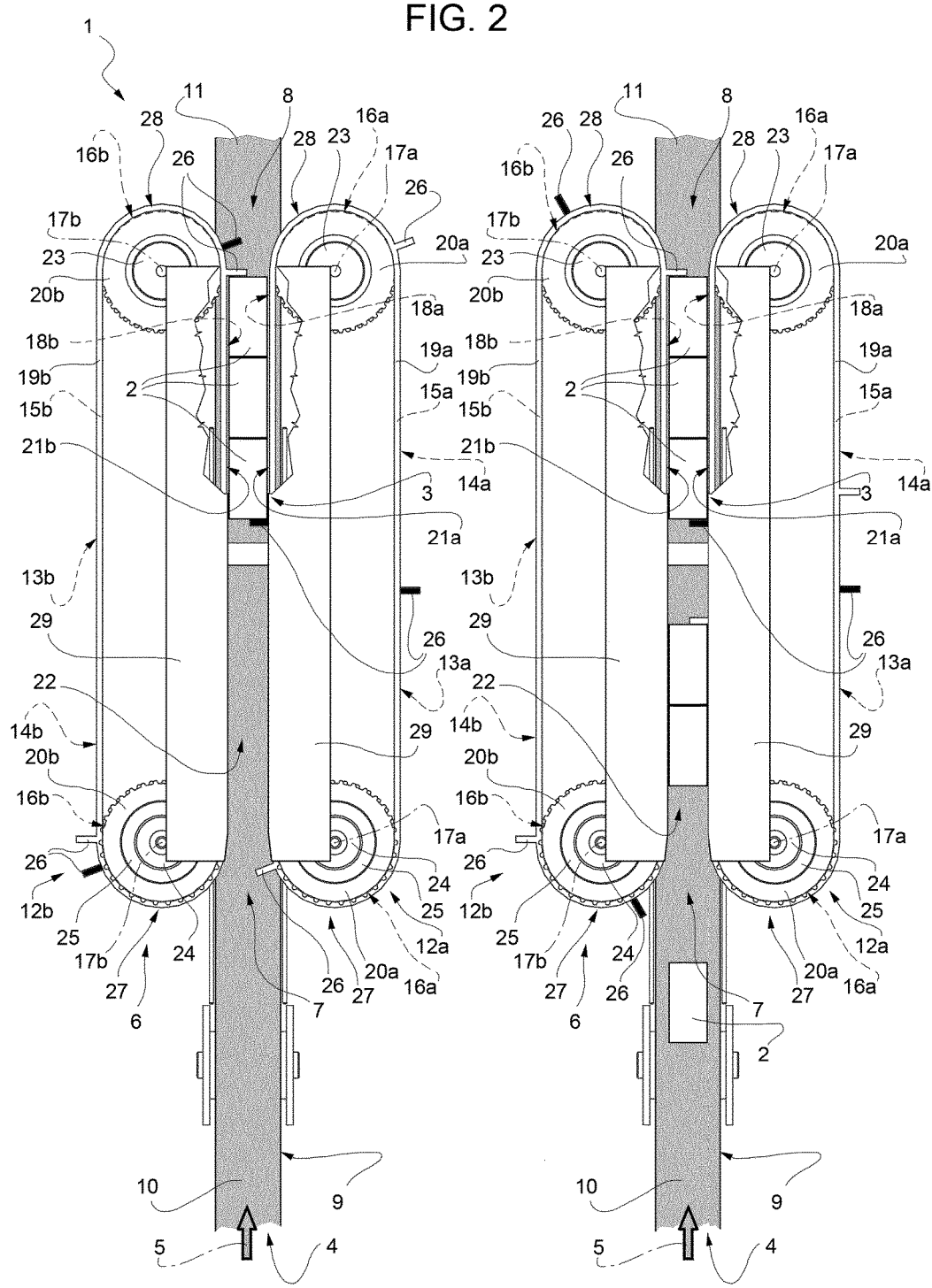
FIG. 2 shows a larger-scale plan view of a detail of FIG. 1, with parts removed for clarity.

Number 1 in FIGS. 1 and 2 indicates as a whole a grouping unit to group packages 2 in a packaging line for the production of multipacks (not shown).

In the following, the term "multipack" is intended to mean a group of packages 2 arranged in a compact arrangement according to a determined format and kept together by an outer overwrapping formed, typically, by a film of plastic material or packaging cardboard.

Although the grouping unit 1 of the present invention is suitable for use in any packaging line for producing multipacks, the present description refers, purely by way of example, to a packaging line for the production of aseptic packages 2 of pourable food products, such as fruit juices, milk, wine, etc.

In a packaging line of this type the grouping unit 1 is arranged normally downstream of a packaging machine (not shown), in which the packages 2, filled with the product, are formed through a (known) sequence of operating steps essentially comprising forming a continuous tube of packaging material, filling the tube with the product, welding and transversally cutting the tube to obtain individual units, and forming the packages 2 from the individual units.

The packages 2 thus obtained are then supplied to the unit grouping 1 to be grouped to form groups 3 containing a number N>1 of packages 2 aligned with each other so as to form a row of packages 2.

The multipack forming process ends in a wrapping machine (not shown), which is arranged downstream of the grouping unit 1 and is configured to receive in succession, from the grouping unit 1, a number M≥1 of groups 3 and to wrap the M groups 3, previously grouped in a compact assembly, with a wrapping material, normally a plastic film or a cardboard, so forming a multipack.

Depending on the required format, the multipack can contain only one group 3, namely a single row of N packages, or M groups 3, namely M×N packages ordered in M rows.

In the example illustrated in the accompanying drawings and described in the following, the grouping unit 1 has a multi-line configuration for the production of multipacks having a "2×3 format", where the first digit indicates the number of groups 3, namely the number of rows in the multipack, while the second digit indicates the number of packages 2 forming each group 3.

To this purpose, the grouping unit 1 comprises a number of grouping lines 4, which extend parallel each other in a substantially horizontal package advancement direction 5. The number of grouping lines 4 depends on the format of the multipack to be produced and may be greater than or equal to 1. In the example illustrated, the grouping unit 1 comprises two grouping lines 4.

The packages 2 are fed to the grouping unit 1 through a divider (known and not illustrated), which is adapted to remove packages 2 from an output of the packaging machine (not shown) and feed the packages 2, at an input speed V1, to the grouping unit 1 while distributing the packages into the grouping lines 4. In particular, as it will be explained below, the divider is operable to feed the grouping lines 4 sequentially, namely from the first to the last, and cyclically, namely by repeating the sequence continuously, and releasing each time, on each grouping line 4, three packages 2 before starting to feed the next line 4.

For each grouping line 4, the grouping unit 1 comprises a grouping assembly 6, which has a package inlet 7 to receive a succession of packages 2 entering the grouping assembly 6 with the speed V1, and a group outlet 8 to release a succession of groups 3 arranged with a desired spacing and moving at a speed V2 lower than the speed V1 and equal to the input speed of the wrapping machine (not shown).

For each line 4, the grouping unit 1 further comprises a respective linear conveyor 9, which runs past the grouping assembly 6 and comprises, in turn, two conveyors, which are arranged contiguously one after the other in the advancement direction 5. Preferably, as in the example illustrated, the conveyors are belt conveyors and comprise an input conveyor 10, which is operable to run continuously at the speed V1 and extends through the package inlet 7 to advance the packages 2 previously delivered to the input conveyor 10 by the divider (not shown); and an output conveyor 11, which is operable to run continuously at the speed V2 and extends through the group outlet 8 to move the groups 3 away from the respective grouping assembly 6.

As shown in FIG. 1 and, in more detail, in FIG. 2, each grouping assembly 6 comprises two identical sub-assemblies 12a, 12b, which are arranged one in front of the other, on opposite sides of the linear conveyor 9.

In particular, each sub-assembly 12a, 12b comprises a pair of stacked annular endless conveyors, which are arranged one on top of the other to move along respective annular paths lying on respective parallel horizontal planes.

In the example illustrated, the annular endless conveyors are in the form of belt conveyors, even if any other type of annular endless conveyor, such as a chain endless conveyor, may be used.

In greater detail, the sub-assembly 12a comprises a lower belt conveyor 13a and an upper belt conveyor 14a, each of which is specular to a respective lower belt conveyor 13b and, respectively, upper belt conveyor 14b of the sub-assembly 12b, with respect to a vertical plane parallel to the advancement direction 5 and passing through a longitudinal symmetry axis of the linear conveyor 9.

Since the sub-assemblies 12a, 12b are structurally identical, the following description will refer, insofar as possible, only to one of them and the reference numerals relating to the other sub-assembly will be put in parenthesis.

The lower belt conveyor 13a (13b) of the sub-assembly 12a (12b) comprises a respective belt 15a (15b) looped around two pulleys 16a (16b), which are rotatably mounted about respective axes 17a (17b) that are vertical and perpendicular to the advancement direction 5.

The two pulleys 16a (16b), one of which is a drive pulley and the other of which is a driven pulley, define, in the lower belt conveyor 13a (13b), a work branch 18a (18b), which extends from the package inlet 7 to the group outlet 8 along, and slightly above, a respective longitudinal edge portion of the linear conveyor 9 and lies on a plane parallel to the advancement direction 5 and perpendicular to the conveying surface of the linear conveyor 9.

The upper belt conveyor 14a (14b) of the sub-assembly 12a (12b) comprises a respective belt 19a (19b) looped around two pulleys 20a (20b), each of which is coaxial to a respective pulley 16a (16b) of the lower belt conveyor 13a (13b) to rotate about the same axis 17a (17b).

The two pulleys 20a (20b), one of which is a drive pulley and the other of which is a driven pulley, define, in the upper belt conveyor 14a (14b), a work branch 21a (21b), which extends above the work branch 18a (18b) and is coplanar with the work branch 18a (18b).

The work branches 18a and 21a of the sub-assembly 12a face the work branches 18b and, respectively, 21b of the sub-assembly 12b and define, with the work branches 18b and 21b, a package grouping channel 22, which extends from the package inlet 7 to the group outlet 8.

As stated above, one pulley in the pair of pulleys 16a (16b) and one pulley in the pair of pulleys 20a (20b) are driven pulleys—in the drawings, the pulleys 16a (16b) and 20a (20b) arranged close to the package inlet 7—and are rotatably journaled on a common shaft 23 by means of respective bearings (not shown).

The other pulley in the pair of pulleys 16a (16b) and the other pulley in the pair of pulleys 21a (21b) are powered and are non-rotatably journaled on respective shafts 24, 25, which are coaxial to each other and to the axis 17a (17b) and are angularly independent one of the other.

In particular, the shafts 24, 25 of the sub-assembly 12a are powered by respective actuating devices (not shown) to rotate in the same rotation direction (clockwise in FIG. 2) and according to independent motion profiles.

Analogously, the shafts 24, 25 of the sub-assembly 12b are powered by respective actuating devices (not shown) to rotate in the same rotation direction (counter-clockwise in FIG. 2) opposite to the rotation direction of the shafts 24, 25 of the sub-assembly 12a, i.e. opposite to the rotation direction of the pulleys 16a and 21a, and according to respective motion profiles independent one of the other and of the motion profile of the shafts 24, 25 of the sub-assembly 12a.

The lower belt conveyor 13a (13b) and the upper belt conveyor 14a (14b) of each sub-assembly 12a (12b) are provided with a certain number of package retaining elements 26.

In the embodiment the number of package retaining elements 26 is the same for all the belt conveyors. The package retaining elements 26 are evenly spaced apart along, and rigidly fastened to, the respective belt 15a (15b), 19a (19b) and, as it will be clearly explained in the following, are designed to cooperate with the packages 2 fed through the package inlet 7 to group the packages 2 and guide the groups 3 up to the group delivery outlet 8.

In particular, each retaining element 26 is defined by a substantially plate-shaped element which protrudes transversally from the exterior surface of the belt 15a, (15b), 19a (19b) and is moved by the respective belt 15a (15b), 19a (19b) along a respective substantially horizontal annular path extending along the respective work branch 18a (18b), 21a (21b) and a return branch, which is joined to the work branch through two curved portions.

With reference to FIG. 2, the curved portions of the return branch comprise an input curved portion 27, which joins the work branch 18a (18b), 21a (21b) at the package inlet 7, and an output curved portion 28, which joins the work branch 18a (18b), 21a (21b) at the group outlet 8. When moving along the grouping channel 22, each retaining element 26 extends orthogonally to the advancement direction 5 towards the center, i.e. the inside, of the grouping channel 22.

In the illustrated example, each belt 15a (15b), 19a (19b) comprises a pair of retaining elements 26 that are arranged at the same distance one from the other.

As shown in FIG. 1, the width, measured in a vertical direction, of each retaining element 26 is equal to, or smaller than, the width of the respective belt in such a way that the retaining elements 26 of different belt conveyors in the same sub-assembly 12a, 12b do not interfere with each other.

As shown in FIG. 2, along the grouping channel 22, the packages 2 are restrained laterally by a pair of coplanar guiding plates 29, which are rigidly connected to respective sub-assemblies 12a, 12b and are designed to cooperate one with the other to transversally reduce the width of the grouping channel 22 so as to prevent packages 2 from coming into contact with the belts 15a, 15b, 19a, 19b when they move along the grouping channel 22.

To this purpose, each guiding plate 29 in each sub-assembly 12a, 12b is arranged above the respective upper belt conveyor 14a, 14b and has a longitudinal free edge, which extends in the advancement direction 5, faces the longitudinal free edge of the other guiding plate 29 and protrudes transversally towards the center, i.e. the inside, of the grouping channel 22 beyond the respective work branches 18a, 18b, 21a, 21b.

Finally, as shown in FIG. 1, each line 4 is provided with a respective group removing apparatus 30, which is arranged downstream of the respective grouping assembly 6 in the advancement direction 5 and is designed to hold the groups 3 which are moved away from the grouping assembly 6 by the output conveyor 11.

In particular, each group removing apparatus 30 comprises a pair of belt conveyors 31 arranged on opposite sides of the respective output conveyor 11. Each belt conveyor 31 comprises a respective belt looped around two respective pulleys, which are rotatably mounted about respective axes parallel to axis 17a (17b) and define, on the respective belt, a work branch extending on a vertical plane parallel to the advancement direction.

The work branches in each group removing apparatus 30 are mutually arranged in such a way as to define a group passage 32, through which the groups 3 coming out from the respective grouping assembly 6 are guided and advanced to an inlet of the wrapping machine (non shown). One pulley of each belt conveyor 31 is a driven pulley and is coaxial to the driven pulleys 16a (16b), 20a (20b); the other pulley of each belt conveyor 31 is a powered pulley and is operable to move the respective belt at the speed V2 as the respective output conveyor 11.

According to a different embodiment not shown, the group removing apparatus 30 is replaced by a pair of fixed bars arranged on opposite sides of the output conveyor 11 to define a stationary lateral guide for the groups 3 advanced by the output conveyor 11 towards the wrapping machine.

The operation of the grouping unit 1 is described below with reference to FIG. 2, where the input conveyor 10 advances a package 2 towards the package inlet 7 of a first one of the two grouping lines 4, while in each grouping line 4 a group 3 is already formed and arranged close to the respective group outlet 8.

In this connection, it is worth noting that, in the case of a multi-line configuration, such as that of the grouping unit 1 in the illustrated example, when the groups 3 reach the group outlet 8 of the respective grouping assembly 6, it is necessary that the groups 3 advance at the speed V2 and are aligned in a direction perpendicular to the advancement direction 5 in such a way as to form a common front and to be withdrawn simultaneously and fed all together to the wrapping machine (not shown).

As stated above, the divider (not shown) is operated to supply the grouping lines 4 cyclically and sequentially and, at each cycle, release to each input conveyor 10 a number N of packages 2, in the illustrated example three packages 2.

The two lower belt conveyors 13a, 13b and the two upper belt conveyor 14a, 14b in each grouping assembly 6 are powered independently from each other and are controlled in such a way that, when the first packages 2 of the three packages 2 released each time by the divider is about to reach the package inlet 7, one retaining elements 26 carried by a lower/upper belt conveyor 13a, 13b, 14a, 14b is moved through the package inlet 7 at a speed V3 lower than the speed V1 of the input conveyor 10.

It follows that, since the speed of the packages 2 is greater than the speed of the retaining element 26, the retaining element 26 cooperates with the leading surface of the package 2, with respect to the advancement direction 5, to slow down the package 2 and, as the other packages 2 enter the grouping channel 22, they are pushed one against the other by the input conveyor 10 to form a compact group 3.

When the last package 2 in the group 3 to be formed has just passed through the package inlet 7, another retaining element 26, which is carried by a lower/upper belt conveyor 13a, 13b, 14a, 14b different from that carrying the retaining element 26 at the front of the group 3, is moved through the package inlet 7 to cooperate with a trailing surface of the last package 2.

When the rear retaining element 26, i.e. the retaining element 26 at the back of the group 3, comes into contact with the last package 2, the rear retaining element 26 is moved in the advancement direction 5 at the same speed V3 as the front retaining element 26 in such a way as to define, with the front retaining element 26, a seat that is so sized as to accommodate a group 3 and is movable, together with the group 3, along the grouping channel 22.

Preferably, before entering the grouping channel 22, the rear retaining element 26 is advanced by the respective belt conveyor at a speed lower than V3 in such a way as to prevent the last package 2 from colliding with the rear retaining element 26 when the latter is advanced along the input curved portion of the respective annular path. On its entering the grouping channel 22, the rear retaining element 26 is accelerated up to come into contact with the trailing surface of the last package 2 and, from here on, is advanced at the speed V3 synchronously with the front retaining element 26.

Along the grouping channel 22, the rear retaining element 26 acts as a controller of the stability of the group 3 preventing a possible tipping back of the last package 2.

The retaining elements 26 are advanced, along with the group 3 and by the respective lower/upper belt conveyors 13a, 13b, 14a, 14b, along the input conveyor and the output conveyor 11 according to a given motion profile such that, before reaching the group outlet 8, the speed of both the front retaining element and the rear retaining element 26 is equal to the speed V2 of the output conveyor 11.

Once it has reached the group outlet 8, the front retaining element 26 continues along its annular path leaving the group 3 free to advance in the advancement direction 5 on the output conveyor 11.

Preferably, before the rear retaining element 26 reaching the group outlet 8, the rear retaining element 26 is slowed down in such a way as to prevent the last package 2 from colliding with the rear retaining element 26, when the latter is advanced along the output curved portion 28 of the respective annular path.

As shown in FIG. 2, while a group 3 is about to be released on the output conveyor 11, another pair of retaining elements 26, which are connected to respective lower/upper belt conveyors 13a, 13b, 14a, 14b not involved in the formation of such group 3, reach, one after the other, the package inlet 7 and cooperate with each other to form a new group 3 (FIG. 2).

It follows that—in the embodiment shown—the retaining elements 26 of each lower/upper belt conveyor 13a, 13b, 14a, 14b reach the package inlet 7 every second group 3 of packages 2 to be formed.

In FIG. 2, the retaining elements 26 of the lower belt conveyors 13a, 13b are black colored, while the retaining elements 26 of the upper belt conveyors 14a, 14b are white colored. As it can be appreciate, the pair of retaining elements 26 which cooperate to form a respective group 3 belong to respective lower/upper belt conveyors 13a, 13b, 14a, 14b in different sub-assemblies 12a, 12b; it means that, if the front retaining element 26 belongs to an upper belt conveyor 14a, 14b of the sub-assembly 12a, 12b, the rear retaining element 26 belongs to a lower belt conveyor 13b, 13a in the other sub-assembly 12b, 12a.

In a different embodiment not shown, the front retaining element 26 and the rear retaining element 26 belong to different belt conveyors in the same sub-assembly 12a, 12b.

In FIG. 2, the front retaining elements 26 belong to the upper belt conveyors 14a, 14b, while the rear retaining elements 26 belong to the lower belt conveyors 13a, 13b. However, it is only a matter of choice and a pair of front retaining elements 26 and rear retaining elements 26 cooperating to form a group may belong indifferently to the upper belt conveyors or lower belt conveyors provided that the front retaining elements 26 and the rear retaining elements 26 do not belong to the same belt conveyor.

The lower/upper belt conveyors 13a, 13b, 14a, 14b of each grouping assembly 6 are operated independently from each other according to respective motion profiles in such a way that a front retaining element 26 reaches the package inlet of the respective grouping line 4 synchronously with the package feeding sequence of the divider (not shown) and move through the group outlet 8 of the respective grouping line 4 only when the group outlet 8 of each of the other grouping lines 4 have been reached by a respective front retaining element 26 in such a way that M groups 3, each from a respective line 4, are delivered at the same time.

This result is achieved by the lower/upper belt conveyors 13a, 13b, 14a, 14b being operated independently, which results in the speed of the retaining elements 26 being adjustable according to a determined motion profile.

In general, the motion profiles of the lower/upper belt conveyors 13a, 13b, 14a, 14b are set to take account of a plurality of operating conditions, in particular the speed V1 and the speed V2, the number N of packages in each group 3, the number of the grouping lines 4, and the length of each grouping line 4.

The invention claimed is:

1. A package grouping unit for a packaging line operable to produce multipacks, the grouping unit comprising:
    at least one linear conveyor operable to feed, in an advancement direction and according to a package feeding cycle, a succession of packages at a first speed, wherein the linear conveyor comprises:
        an input conveyor, which is movable at the first speed and extend through the package inlet; and
        an output conveyor, which is aligned to the input conveyor in the advancement direction, is movable at a second speed lower than the first speed and extends through the group outlet; and
    at least one grouping assembly formed by two sub-assemblies arranged on opposite sides of the linear conveyor;
    wherein each sub-assembly further comprises a pair of stacked conveyors comprising respective work branches, which extend in the advancement direction and define, with the work branches of the stacked conveyors of the other sub-assembly, a package grouping channel having a package inlet and a group outlet;
    wherein each endless conveyor is provided with a number of package retaining elements, which are spaced along, and attached to, the stacked conveyor and protrude transversally into the grouping channel while moving along the respective work branch;
    wherein the stacked conveyors are operable independently from each other to:
        move, at each package feeding cycle, a first retaining element through the package inlet at a third speed lower than the first speed so as to reduce a speed of a first package in the succession and cause the packages to group; and
        move a second retaining element, carried by a different stacked conveyor, through the package inlet so as to intercept the last package in the succession and define, with the first retaining element, a seat configured to accommodate a group of packages and is movable, with the group of packages, along the grouping channel.

2. The package grouping unit according to claim 1, wherein the first retaining element is operable by the respective stacked conveyor to move through the group outlet at the second speed so as to release a group of packages moving at the same speed as the output conveyor.

3. The package grouping unit according to claim 1, wherein the first retaining element and the second retaining element are carried by respective endless conveyors belonging to different sub-assemblies.

4. The package grouping unit according to claim 1, wherein the first retaining element and the second retaining element are carried by respective stacked conveyors belonging to the same sub-assembly.

5. The package grouping unit according to claim 1, wherein, in each sub-assembly, the work branches are arranged one on top the other, extend on a same substantially vertical plane parallel to the advancement direction, and face the corresponding work branches of the other sub-assembly.

6. The package grouping unit according to claim 1, wherein, in each stacked conveyor, the retaining elements are defined by substantially plate-shaped elements, which protrude transversally from an exterior surface of the stacked conveyor and are moved, by the stacked conveyor, along a substantially horizontal annular path extending along the respective work branch.

7. The package grouping unit according to claim 1, wherein the sub-assemblies are provided with respective fixed package guiding members, which are configured to cooperate with each other to transversally reduce the width of the grouping channel so as to guide laterally the packages and prevent the packages from coming into contact with the work branches when the packages move along the grouping channel.

8. The package grouping unit according to claim 1, wherein the grouping unit comprises a plurality of linear conveyors, which are adapted to receive a respective number of packages in succession, according to a package feeding cyclic sequence; the endless conveyors of each grouping assembly are operable according to respective motion profiles in such a way that the first retaining element in one of the grouping assemblies reaches the respective package inlet according to said package feeding cyclic sequence, and, before moving through the respective group outlet to release the respective group of packages, is aligned with the first retaining elements in the other grouping assemblies, in a direction perpendicular to the advancement direction.

* * * * *